United States Patent [19]

Weitzen

[11] 4,341,078
[45] Jul. 27, 1982

[54] IMMOBILIZING TOXIC LIQUIDS

[75] Inventor: William Weitzen, Bethesda, Md.

[73] Assignee: General Technology Applications, Inc., Arlington, Va.

[21] Appl. No.: 175,561

[22] Filed: Aug. 5, 1980

[51] Int. Cl.³ .............................................. F17C 11/00
[52] U.S. Cl. ............................................ 62/48; 62/70; 137/209; 169/45; 220/88 B
[58] Field of Search .................. 62/48, 55, 69, 70; 206/0.6, 0.7; 220/88 B, 216, 218; 137/209; 141/1; 169/44, 45, 46

[56] References Cited

U.S. PATENT DOCUMENTS

| | | | |
|---|---|---|---|
| 2,936,834 | 5/1960 | Gomory | 169/45 |
| 3,349,945 | 10/1967 | Baker | 220/216 |
| 3,380,462 | 4/1968 | Schieber et al. | 137/209 |
| 3,850,206 | 11/1974 | Canevari et al. | 220/16 |
| 3,880,179 | 4/1975 | Lenz et al. | 137/209 |
| 4,124,997 | 11/1978 | Sadjine et al. | 62/320 |

FOREIGN PATENT DOCUMENTS 54-47902  2/1979  Japan ................................. 220/216

OTHER PUBLICATIONS

"Several Remedies for the Treatment of Spillages of Liquid Hazardous Chemicals", Proc. of 1980 Nat. Conf. on Control of Hazardous Spills, pp. 103–108.
"Methods to Treat, Control and Monitor Spilled Hazardous Materials", Calspan Corp., NTIS Pub. Nos. PB-243 & 306, pp. 62–79, (1975).

*Primary Examiner*—Ronald C. Capossela
*Attorney, Agent, or Firm*—Roland H. Shubert

[57] ABSTRACT

Toxic liquids, especially halogenated aromatic hydrocarbons, are immobilized within a container by dispersing cryogenically comminuted polymer particles in a surface active state throughout the liquid. The polymer is injected into a container holding the toxic liquid as a slurry of particles in a cryogenic refrigerant. Use of a heat, shear or radiation degradable polymer as the immobilizing agent allows the solidified liquid to be returned to a fluid state for later disposal by incineration.

28 Claims, 2 Drawing Figures

IMMOBILIZING TOXIC LIQUIDS

BACKGROUND OF THE INVENTION

This invention relates generally to a method and apparatus for immobilizing toxic or hazardous liquids to enhance the safety of interim storage and transportation.

More specifically, this invention relates to the addition of activated polymer particles to a toxic liquid held within a container to immobilize and solidify the liquid therein.

The safe handling, storage, transportation and disposal of toxic liquid wastes, especially those comprising halogenated aromatic hydrocarbons, has been of increasing public and governmental concern. Examples of particularly troublesome materials include dioxin-contaminated herbicides and manufacturing waste solvents and polychlorinated biphenyls (PCBs). Dioxin is a very potent carcinogen while PCBs are an acute toxin and are known to affect and interfere with reproduction success in animals. Halogens aromatic hydrocarbons in general, and PCBs in particular, are extremely stable compounds, highly resistant to degradation in the natural environment and essentially inert toward other chemicals including common oxidizing agents, acids and bases. PCBs are soluble in most of the common organic solvents but only very slightly soluble in water. Because of their stability and general chemical inertness, these compounds have found wide use as dielectric fluids, heat transfer liquids, hydraulic fluids and plasticizers.

Although new industrial uses of PCBs have been curtailed there is a large volume of PCBs in storage in the United States and many devices, especially transformers and capacitors, still in use contain PCBs, all of which will eventually require safe disposal. High temperature incineration is now considered to be the only appropriate disposal technique for PCB liquids and adequate approved incinerator capacity for such disposal is presently unavailable. Consequently, there exists a pressing problem of interim storage of PCBs in a safe manner and the need for transportation methods to remove PCBs and similar hazardous liquids from their source to a disposal facility. Typical interim storage methods in use at this time include containment in drums or barrels. Corrosive failure of such containment vessels is a relatively common experience and rupture of the vessels during transportation is an ever-present hazard.

There is disclosed in the inventor's prior U.S. patent application Ser. No. 117,235 a method for the extremely rapid dissolution of polymeric materials in compatible liquid solvents. The technique therein disclosed comprises the cryogenic comminution of polymeric materials to form activated particles which dissolve with great rapidity in solvent liquids. The disclosure in that application is incorporated herein by reference.

A paper entitled "Several Remedies for the Treatment of Spillages of Liquid Hazardous Chemicals" by G. K. Braley, published in the Proceedings of the 1980 Conference on Control of Hazardous Material Spills, May 13-15, 1980, Louisville, Ky., pages 103-108, describes a method for containing spillages of various chlorinated residues and halogenated solvents. As reported in this paper, treatment of such materials with Hycar 1422 (a polyacylonitrile-butadiene copolymer manufactured by B. F. Goodrich) resulted in the solidification of the spilled liquids.

A report prepared by the CALSPAN Corporation for the National Environmental Research Center, entitled "Methods to Treat, Control and Monitor Spilled Hazardous Materials," dated June, 1975, pages 62-70, describes a method for immobilizing hazardous chemical spills. Treatment of the spills with a gelling agent consisting of four active ingredients and one inert powder congealed chlorinated liquids into a viscous, sticky mass.

SUMMARY OF THE INVENTION

Toxic and/or hazardous halogenated hydrocarbon liquids such as PCBs or mixtures of PCBs with other solvents are immobilized within a storage or containment vessel by injecting into the liquid contained in the vessel a slurry of cryogenically comminuted polymer particles in a cryogenic refrigerant. Vaporization of the refrigerant causes dispersion of the polymer particles in the liquid, resulting in very rapid dissolution of the particles to form an immobilized, rubbery solid at polymer concentrations ranging from about 5% to 20% based on liquid weight. Injection of the polymercryogenic refrigerant into the liquid may be accomplished by means of a pipe delivering the slurry from a dewar or other suitable insulated container. The solidified material may be converted back to a flowable liquid for convenient disposal as by incineration by heating the solid to moderately elevated temperatures, by subjecting the solid to conditions of high shear, by exposing the solid to ionizing radiation including gamma radiation, X-radiation, ultraviolet radiation, high voltage electrons, laser radiation, ultrasonic radiation and the like or by various combinations of the above.

Hence, it is an object of this invention to transform liquid halogenated hydrocarbons to an immobilized state.

It is another object of this invention to convert halogenated aromatic hydrocarbons from a liquid to a rubbery solid.

Another object of this invention is to provide a means for converting halogenated aromatic hydrocarbon into a chemically stable rubbery solid.

Yet another object of this invention is to provide techniques for enhancing the safety of interim storage and transportation of hazardous liquid wastes.

A specific object of this invention is to solidify PCB liquids and similar materials within a containment vessel.

Another object of this invention is to provide means for injecting a polymer-cryogenic refrigerant slurry into a liquid-containing vessel.

DESCRIPTION OF THE DRAWING

Specific embodiments of the invention are illustrated in the drawing in which.

DISCUSSION AND DESCRIPTION OF THE INVENTION

Figure 1:
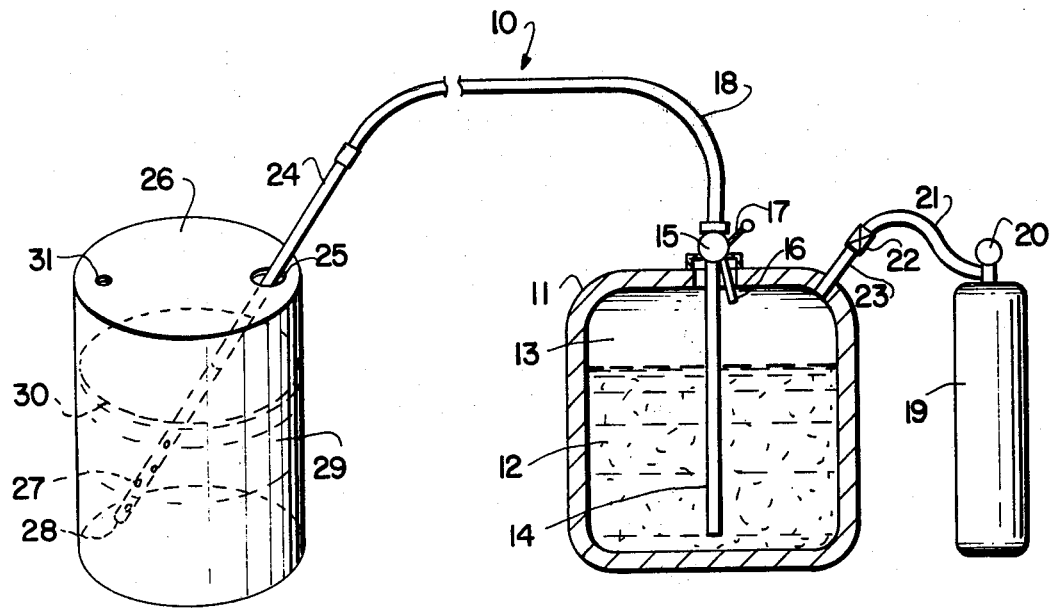
FIG. 1 is a partial sectional of means for injecting a slurry into a container partially filled with a toxic liquid.

The invention will be described in relation to its use in immobilizing PCBs and solvent solutions of PCBs, it being understood that essentially the same techniques are appropriate for other toxic, non-aqueous liquid wastes.

As used herein, PCBs are defined as those compounds having the formula $C_{12}H_xCl_{(10-x)}$. As used industrially, PCBs are a mixture of various isomers having a chlorine content by weight typically ranging from less than 40% to more than 60%. PCBs used for capacitor impregnation usually contain about 42% chlorine while transformer fluids generally range from about 42% to 60% chlorine. Boiling points of PCB blends are generally in the 300° C. to 400° C. range with a corresponding specific gravity of about 1.3 to 1.6.

It has been found that toxic liquids such as PCBs and solvents containing PCBs and like contaminants may be immobilized within a barrel, drum or similar storage container. This is accomplished by injecting a slurry of cryogenically comminuted polymer particles in a cryogenic refrigerant into the toxic liquid contained in the storage vessel. Upon admixture of the polymer slurry with the toxic liquid, there is very rapidly formed an extremely viscous, essentially non-flowing gel at relatively low polymer concentrations. Somewhat higher polymer concentrations produces a tough, rubbery solid. The evaporating cryogenic refrigerant acts to mix and disperse the polymer particles throughout the liquid whereupon the particles very rapidly dissolve to form an essentially homogeneous rubbery mass.

Polymeric materials suitable for use in this process include these generally disclosed in applicant's prior patent application Ser. No. 117,235. A preferred group of polymeric materials include relatively high molecular weight rubbery polymers and copolymers. A specific polymer found to produce excellent results in this process is polyisobutylene. Generally speaking, any solid, relatively high molecular weight polymer which displays solubility in chlorinated hydrocarbons may be used in the process. It is also desirable but not essential that the polymer selected will degrade at 1oderately elevated temperatures, i.e., well below the boiling point of PCBs or below about 300° C. (572° F.) or will degrade upon mechanical working or upon exposure to ionizing radiation. Polyisobutylene, among other polymers, will thermally degrade at relatively low temperatures, on the order of 375° to 400° F., and this property enhances the usefulness of polyisobutylene in the process.

It is advantageous that the polymer used in the process be degradable as that property allows the immobilized solid material produced by dissolution of the polymer in the liquid to be returned to a fluid form. Most incinerators of the type appropriate for use in destroying PCBs are designed for a liquid fuel feed and cannot accept solid materials.

Polymers used in this process must be cryogenically comminuted. By this is meant comminuting at very low temperatures; generally below $-100°$ F. The use of liquid nitrogen, which boils at $-321°$ F., as the cryogenic refrigerant is preferred although certain other cryogenic refrigerants may be used as well. After comminution, the polymer particles must be maintained at very cold, essentially cryogenic, temperatures until used in the process. This is best accomplished by collecting the comminuted particles in the liquid cryogenic refrigerant and maintaining them as a slurry in the refrigerant until injected into the toxic liquid.

Cryogenic comminuting of polymeric materials has been found to activate the resulting particles so that they dissolve with remarkable rapidity in solvent liquids. It is believed that this activation results from high energy surfaces which are generated during comminution and preserved at cryogenic temperatures. The existence of high energy sites on the cryogenically comminuted polymer particles has been experimentally verified by means of electron spin analysis which demonstrates the presence of free radicals on the polymer surfaces. Warming of the polymer particles or exposure of the particles to water vapor, atmospheric oxygen or other active compounds tends to dissipate the free radicals and results in a much slower dissolution reaction.

Turning now to FIG. 1, there is shown generally at 10 one means for immobilizing toxic liquids within a barrel or drum. A dewar or other insulated container 11 is partially filled with a slurry 12 of cryogenically comminuted polymer particles in a liquid cryogenic refrigerant leaving a vapor space 13 at the top of the dewar. A dip tube 14 extends to a point near the bottom of the dewar and is connected at its top end to valve means 15. Valve means 15 is so arranged as to allow passage of either a polymer-liquid refrigerant slurry upwardly through dip tube 14 or a vapor stream taken from space 13 through vapor tube 16 depending upon the position of selector lever 17. An insulated conduit 18, which is preferably flexible, is connected to the valve exit port.

An external source of pressurized gas 19 may be provided to furnish a driving force to cause flow of the polymer-refrigerant slurry through the dip tube and out of the dewar. Gas source 19, which may conveniently be a standard gas cylinder, is equipped with pressure regulator 20 and communicates with vapor space 13 through conduit 21, control valve 22 and dewar gas port 23. Control valve 22 is preferably arranged so as to bleed pressure from dewar 11 as well as to supply gas thereto. It is preferred that the pressurized gas of source 19 be identical in composition to the cryogenic refrigerant; when liquid nitrogen is used as the cryogenic refrigerant, then the gas in source 19 is preferably nitrogen. It is to be noted that internal pressure built up in dewar 11 by evaporation of the refrigerant may be used as the driving force to cause slurry flow rather than external gas source 19. However, some control flexibility may be lost by that approach.

Insulated conduit 18 terminates in pipe 24 which is sized so as to be insertable through the bung 25 of barrel or drum 26 which may be a standard 55 gallon steel drum. Pipe 24 is provided with a plurality of ports 27 disposed in proximity to its open end 28 for dispersal of the polymer slurry into the liquid 29 contained in barrel 26. The liquid level 30 in barrel 26 must be adjusted such as to allow for volume expansion of the liquid due to the added polymer and any refrigerant gas which might be trapped in the liquid as it solidifies upon interaction with the polymer. It is necessary to adjust the liquid level 30 so as to provide at least about 10% of the barrel volume as free space above the liquid. Preferably the free space comprises a percentage of the total container volume equal to the amount of polymer to be added plus at least about 5%.

The procedure for immobilizing a barrel of toxic liquid may be carried out in the following manner. Dewar 11 is charged with a slurry of cryogenically comminuted polymer particles, typically polyisobutylene, in a liquid cryogenic refrigerant, preferably liquid nitrogen. The position of valve means 15 is first set to allow cold nitrogen gas taken from vapor space 13 to flow through conduit 18 and pipe 24 so as to chill these components. Pipe 24 is then inserted into a barrel containing toxic liquid in the amnner shown in FIG. 1, valve means 15 is positioned so as to allow flow through dip tube 14 and nitrogen gas from source 19 is used to pressurize the slurry causing flow out of the dewar, through conduit 18 and through the ports in the pipe into the liquid.

Liquid cryogenic refrigerant vaporizes as it contacts the much warmer toxic liquid and the escaping gas is allowed to exit from the barrel through vent 31 or through the free space between pipe 24 and bung 25. In some instances, it may be desirable to attach a splash shield or demister (not shown) to vent 31 so as to capture any liquid splashing from the barrel. Vaporizing refrigerant also causes a thorough physical mixing of the polymer particles which ensures essential homogeneity of the resulting immobilized solid. As soon as a sufficient amount of polymer has been injected into the liquid, in most instances between about 5% and 20% by weight based on weight of liquid, the pipe is withdrawn from the gel and is flushed with refrigerant gas to remove any polymer particles therefrom. The polymer-liquid mixture solidifies very rapidly upon admixture to form a tough, rubber-like material.

During injection of the polymer slurry into the barrel, it is desirable to agitate the polymer-refrigerant slurry so as to maintain a relatively uniform suspension. This may be done by rocking or shaking dewar 11 during the injection period. It is preferred to maintain as high a proportion of polymer to cryogenic refrigerant as possible, so long as it is readily flowable, to hold to a minimum the amount of refrigerant injected into the toxic liquid. A slurry having a polymer-liquid nitrogen weight ratio of about 1:2, for example, displays the flow characteristics of a viscous fluid. In general the weight ratio of polymer to refrigerant should be kept within the range of about 1:0.5 to 1:4.

Figure 2:
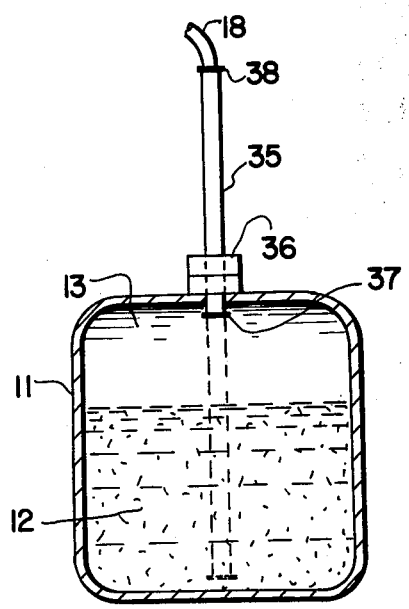
FIG. 2 is an alternative embodiment of the slurry injection means.

Referring now to FIG. 2, there is shown an alternative arrangement for controlling the flow of slurry and gas from the dewar. In this arrangement, a dewar 11 holding a polymer-refrigerant slurry 12 and having a vapor space 13 at the top thereof, is equipped with a slidable tube means 35. Seal means 36 are provided at the top of the dewar and allow tube 35 to slide up and down from a purging or gas flow position shown in the Figure to a slurry flow position wherein the lower end of tube 35 is adjacent the bottom of the dewar as is shown in phantom. Flanges 37 and 38 may be provided at the bottom and the top respectively of tube 35 so as to limit its travel. Flange end 38 of tube 35 is connected to insulated conduit means 18. A pressurized gas source may also be used with this embodiment as is shown at 19 in FIG. 1.

The following examples illustrate particular aspects of the invention which, however, is not to be construed as limited thereby.

EXAMPLE 1

Commercially available polyisobutylene having an intrinsic viscosity (deciliters per gram) of from 5.56 to 7.23, a molecular weight determined by the viscosity averaging method using the viscosity of a solution in isooctane at 20° C. of 4,700,000 and a viscosity (poise) at 20° C. of $1.5 \times 10^{12}$, was cryogenically comminuted to particles having a maximum diameter less than about 0.6 mm. Liquid nitrogen was used to obtain and maintain cryogenic temperature during comminution. The so-prepared particles were then maintained in an insulated vessel as a slurry in liquid nitrogen.

EXAMPLE 2

A sample of PCBs of a grade used in transformers was obtained. A portion of the sample was blended with chlorobenzene to obtain a mixture containing 60% PCBs and 40% chlorobenzene, a mixture which is typical of that used as a transformer fluid. Thereafter, the polymer-liquid nitrogen slurry of Example 1 was added to the PCB-chlorobenzene sample in an amount sufficient to provide a 4.7% blend of polymer in the PCB liquid by weight.

Dissolution of the polymer particles in the liquid was very rapid. The resulting product, at room temperature, was an extremely viscous liquid which would move very slowly when the container was tilted.

EXAMPLE 3

The procedure of Example 2 was repeated at polymer concentrations, as determined by differential weighing, of 10% and 17.7%. At room temperature, the sample containing 10% added polymer was essentially an elastic solid which had no tendency to flow even when the containment vessel was inverted. The sample containing 17.7% added polymer displayed essentially the same characteristics. Both samples remained unchanged in appearance and properties over an extended period of time.

EXAMPLE 4

Another sample of polyisobutylene was cryogenically comminuted in the manner described in Example 1 except that the comminuted particles were not collected in liquid nitrogen but rather were allowed to accumulate in an insulated container.

A quantity of so-prepared polymer particles was added to a PCB-chlorobenzene mixture as in Example 2. A thick crust formed on the liquid. The liquid below remained essentially as before introduction of the polymer.

This example demonstrates the criticality which attaches to the maintenance of particle activity after comminution and until admixed with the toxic liquid.

Although the invention has been described in relation to its use for immobilizing or solidifying highly halogenated toxic wastes such as PCBs, it is equally advantageous for the immobilization of dilute solutions of toxic materials in normally non-hazardous solvents. Examples include hydrocarbons and other solvents contaminated with dioxin, pesticide residues and the like.

I claim:

1. A process for the immobilization of a toxic liquid within a container which comprises injecting a slurry of cryogenically comminuted polymer particles in a cryogenic refrigerant into said liquid within said container.

2. The process of claim 1 wherein said toxic liquid comprises a halogenated aromatic hydrocarbon.

3. The process of claim 2 wherein said halogenated aromatic hydrocarbon is a polychlorinated biphenyl.

4. The process of claim 1 wherein the liquid level within the container is adjusted to provide at least about 10% of the container volume as free space prior to injection of the polymer.

5. The process of claim 4 wherein said polymer comprises a relatively high molecular weight polymer or copolymer.

6. The process of claim 5 wherein the amount of polymer injected into said liquid ranges from about 5% to about 20% by weight based on the weight of said liquid.

7. The process of claim 6 wherein said cryogenic refrigerant is liquid nitrogen.

8. The process of claim 7 wherein said polymer is polyisobutylene.

9. The process of claim 5 wherein said polymer is also thermally degradable at moderately elevated temperatures.

10. The process of claim 9 wherein said immobilized liquid is returned to a fluid state by heating to a temperature whereat said polymer degrades.

11. The process of claim 10 wherein said immobilized liquid comprises polychlorinated biphenyls.

12. The process of claim 5 wherein said polymer is mechanically degradable and wherein said immobilized liquid is returned to a fluid state by mechanical working.

13. The process of claim 12 wherein said immobilized liquid comprises polychlorinated biphenyls.

14. The process of claim 5 wherein said polymer is degradable by ionizing radiation and wherein said immobilized liquid is returned to a fluid state by exposure to ionizing radiation.

15. The process of claim 14 wherein said immobilized liquid comprises polychlorinated biphenyls.

16. A method for decreasing the hazards associated with the interim storage and transportation of toxic liquids which comprises immobilizing said liquids by admixing therewith and dissolving therein surface active particles of a cryogenically comminuted polymeric material in sufficient amount to form an essentially homogeneous, non-flowing rubbery mass.

17. The method of claim 16 wherein said toxic liquids comprise halogenated aromatic hydrocarbons.

18. The method of claim 17 wherein said toxic liquids are immobilized within containers suitable for storage and transport.

19. The method of claim 18 wherein said polymeric particles are admixed with said toxic liquid by injecting a slurry of said particles in a cryogenic refrigerant into said liquid within said container.

20. The method of claim 19 wherein said polymeric material comprises a relatively high molecular weight, polymer or copolymer and wherein said cryogenic refrigerant is liquid nitrogen.

21. The method of claim 20 wherein the amount of polymer injected into said liquid ranges from about 5% to about 20% by weight based on the weight of said liquid.

22. The method of claim 21 wherein said polymeric material is thermally degradable at moderately elevated temperatures.

23. The method of claim 22 wherein said immobilized liquid is returned to a fluid state after transport by heating to a temperature whereat said polymer degrades.

24. The method of claim 23 wherein said polymer is polyisobutylene.

25. The method of claim 17 wherein said polymeric material is mechanically degradable and wherein the immobilized liquid is returned to a fluid state after transport by mechanical working.

26. The method of claim 25 wherein said immobilized liquid comprises polychlorinated biphenyls.

27. The method of claim 17 wherein said polymeric materials is degradable by ionizing radiation and wherein the immobilized liquid is returned to a fluid state by exposure to ionizing radiation.

28. The method of claim 27 wherein said immobilized liquid comprises polychlorinated biphenyls.

* * * * *